UNITED STATES PATENT OFFICE.

HERMANN LEY, OF ELBERFELD, GERMANY, ASSIGNOR TO VEREINIGTE SEIDENFÄRBEREIEN C. A. LANGENBECK & I. P. LOHE, OF ELBERFELD, GERMANY, A FIRM.

PROCESS OF SOFTENING WATER.

1,109,849. Specification of Letters Patent. Patented Sept. 8, 1914.

No Drawing. Application filed November 24, 1913. Serial No. 802,647.

*To all whom it may concern:*

Be it known that I, HERMANN LEY, chemist, a subject of the King of Prussia, residing at No. 10 Gambrinusstrasse, Elberfeld, in the Kingdom of Prussia, German Empire, have invented a new and useful Improvement in Processes of Softening Water.

It is known that the hardness, that is to say the lime and magnesium salts, can be withdrawn from a water by causing the water to trickle or run over double silicates of alumina, whether these be artificial or natural. The reaction consists in the exchange of the alkali-metal bases, soda or potash, of the double silicate of alumina for these of the calcium and magnesium salts of the hard water. It is generally accepted that this property of softening a water belongs only to the double silicates of alumina, but I have observed that other silicates possess analogous properties. This discovery constitutes the basis of the present invention.

When a water is mixed with a substance which is obtained by heating a solution of an alkali-metal silicate with a solution of a compound of an alkali-metal or alkaline-earth metal, such as common salt, sulfate of soda or another salt, the production of which substances with the exception of those produced by the reaction of a solution of phosphate of soda with a solution of soda water glass described below is in itself known, and this mixture is shaken, it is found on testing the hardness of the water that this has been considerably diminished or eliminated by the treatment with the substance in question; the following experimental details confirm this.

1. 100 liters of a solution of phosphate of soda of 10 per cent. strength is mixed with 1 liter of soda water glass solution and the mixture is heated to boiling. The precipitate thus obtained is collected, washed with soft water until the alkaline reaction has disappeared, and is then dried at 65° C. The comminuted product is sifted so as to produce a size of grain as uniform as possible. This constitutes a softening agent.

2. Another material for the same purpose is obtained by mixing 100 liters of a solution of sulfate of soda of 10 per cent. strength with 1 liter of soda-water glass solution and the mixture is heated. The precipitate produced is treated in manner analogous to that described under 1. 100 grams of either of these products is charged into a suitable glass tube and water of 9° hardness is allowed to trickle over the material at such a speed that in the course of an hour one liter of purified water is obtained.

The proportions given are selected because in practice 300 cubic meters of a water of 9° hardness are softened in 10 hours with about 3000 kilos of permutite. The 100 grams of softening material containing about 30 per cent. of moisture must soften 10 liters of water completely in 10 hours in order that the same effect may be obtained as is obtained with permutite.

The experiments gave the following results:—

(*a*) The water filtered through the softening material obtained in accordance with the prescription given under 1 showed 0° of hardness after passage of 12 liters of the water, $\frac{1}{2}$° of hardness after passage of 14 liters of the water,
1° "      "      "      "      " 15 "      "      "      "
2° "      "      "      "      " 16 "      "      "      "
3° "      "      "      "      " 17 "      "      "      "

(*b*) The water filtered through the softening material obtained according to the prescription given under 2 showed the following results:—

0° of hardness after passage of 10 liters of the water
$\frac{1}{2}$° "      "      "      "      " 14 "      "      "      "
1° "      "      "      "      " 15 "      "      "      "
2° "      "      "      "      " 16 "      "      "      "
3° "      "      "      "      " 18 "      "      "      "

The silicate exhausted after repeated use recovered its original power of softening the water when it was regenerated with common salt in manner analogous to the treatment of double silicates of aluminium.

It has been found that in making a softening agent by heating an alkali-metal silicate solution with a solution of phosphate of soda an essentially higher yield of the agent is obtained as compared with that produced when other alkali-metal compounds, such as sodium chlorid, sodium sulfate or sodium acetate are used, so that the use of phosphate of soda for making the softening agent is most suitable from the point of view of economy. For the purpose of comparison experiments were undertaken in which on the one hand a solution of sodium sulfate, sodium chlorid or sodium acetate was added to the alkali-metal silicate solution for producing a precipitate in the manner already known, and on the other hand phosphate of soda solution was used. The result was as follows:—

*I. By adding sodium sulfate, sodium chlorid or sodium acetate to water glass.*— 1. 3 kilos of water glass were mixed with 100 liters of a neutral solution of the salt of 10 per cent. strength; 200 grams of precipitate were obtained corresponding with 6.7 per cent. of the water glass used. 2. 4 kilos of water glass were mixed with 100 liters of a neutral solution of the salt of 10 per cent. strength; 300 grams of precipitate were obtained corresponding with 7.5 per cent. of the water glass used. 3. 5 kilos of water glass were mixed with 100 liters of a neutral solution of the salt of 10 per cent. strength; 400 grams of precipitate were obtained corresponding with 8 per cent. of the water glass used.

*II. By addition of phosphate of soda to water glass.*—1. 3 kilos of water glass were mixed with 100 liters of phosphate of soda solution of 10 per cent. strength; 750 grams of precipitate were obtained corresponding with 25 per cent. of the water glass used. 2. 4 kilos of water glass were mixed with 100 liters of phosphate of soda solution of 10 per cent. strength; 1050 grams of precipitate were obtained corresponding with 26 per cent. of the water glass used. 3. 5 kilos of water glass were mixed with 100 liters of phosphate of soda solution of 10 per cent. strength; 2300 grams of precipitate were obtained corresponding with 40 per cent. of the water glass used.

From the foregoing figures it follows clearly that the separation of the softening agent from the water glass by means of phosphate of soda solution is much more considerable than by means of the neutral salts hitherto used and this is of great advantage in a technical sense.

I wish it to be understood that for the purposes of this invention alkali-metal salts are the equivalent of alkaline-earth metal salts.

What I claim as my invention and desire to secure by Letters Patent is:—

1. The process of softening water by treating it with a precipitate obtained by mixing a solution of phosphate of soda with a solution of an alkali-metal silicate, the softening effect being obtained by an exchange of bases, substantially as set forth.

2. A process for making a water softening agent of the kind which acts by the exchange of bases, which process consists in mixing a solution of phosphate of soda with a solution of an alkali-metal silicate and separating the precipitate produced.

HERMANN LEY. [L. S.]

Witnesses:
 ALBERT KEEFER,
 R. LOHE.